United States Patent [19]
McMahon

[11] Patent Number: 5,867,724
[45] Date of Patent: Feb. 2, 1999

[54] INTEGRATED ROUTING AND SHIFTING CIRCUIT AND METHOD OF OPERATION

[75] Inventor: Ronald S. McMahon, Plano, Tex.

[73] Assignee: National Semiconductor Corporation, Santa Clara, Calif.

[21] Appl. No.: 865,663

[22] Filed: May 30, 1997

[51] Int. Cl.[6] .............................. G06F 9/44; G06F 13/20
[52] U.S. Cl. ............... 395/800.22; 395/881; 395/200.45
[58] Field of Search .................................. 370/489, 438;
341/107, 106; 340/825.07, 825.06; 348/708;
371/20.5, 68.2, 71.42; 395/700.45, 458.55,
287, 386, 500.61, 800.13, 800.24, 800.2,
578, 307, 488, 800.16, 800.22; 314/704,
200.61, DIG. 1, 715.8, DIG. 2; 364/DIG. 1,
DIG. 2

[56] References Cited

U.S. PATENT DOCUMENTS

| | | | |
|---|---|---|---|
| 5,172,381 | 12/1992 | Karp et al. ................................. | 371/42 |
| 5,379,240 | 1/1995 | Byrne ................................. | 364/715.08 |
| 5,594,911 | 1/1997 | Cruz et al. .......................... | 364/DIG. 1 |

OTHER PUBLICATIONS

Backgrounder, "Vproming pentium® Processor with MMX™ Technology", Intel Internet publication, Oct. 22, 1996.

*Primary Examiner*—Daniel H. Pan
*Attorney, Agent, or Firm*—John L. Maxin

[57] ABSTRACT

For use in an x86-compatible processor capable of executing MMX™ instructions calling for partitioned data to be shifted or routed, an integrated routing and shifting circuit, a method of operation and a computer system containing the same. In one embodiment, the circuit includes: (1) a lower shifter that receives partitioned data therein and shifts at least a first portion of the partitioned data as a function of a received control signal and (2) an upper shifter/router, coupled to the lower shifter and having partitioned input lines and partitioned output lines, that receives the partitioned data from the lower shifter into the source register and selectively shifts or routes at least a second portion of the partitioned data as a function of the received control signal while transferring the partitioned data from the partitioned input lines to the partitioned output lines.

20 Claims, 7 Drawing Sheets

INTEGRATED ROUTING AND SHIFTING CIRCUIT AND METHOD OF OPERATION

TECHNICAL FIELD OF THE INVENTION

The present invention is directed, in general, to microprocessors and, more specifically, to microprocessors that integrate routing and shifting circuits with other microprocessor functional units.

BACKGROUND OF THE INVENTION

The ever-growing requirement for high performance computers demands that state-of-the-art microprocessors execute instructions in the minimum amount of time. Over the years, efforts to increase microprocessor speeds have followed different approaches. One approach is to increase the speed of the clock that drives the processor. As the clock rate increases, however, the processor's power consumption and temperature also increase. Increased power consumption increases electrical costs and depletes batteries in portable computers more rapidly, while high circuit temperatures may damage the processor. Furthermore, processor clock speed may not increase beyond a threshold physical speed at which signals may traverse the processor. Simply stated, there is a practical maximum to the clock speed that is acceptable to conventional processors.

An alternate approach to improving processor speeds is to reduce the number of clock cycles required to perform a given instruction. Under this approach, instructions will execute faster and overall processor "throughput" will thereby increase, even if the clock speed remains the same. One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster. "Superpipelining" extends the pipelining concept further by allowing the simultaneous processing of multiple instructions in the pipeline. Consider, for example, a processor in which each instruction executes in six stages, each stage requiring a single clock cycle to perform its function. Six separate instructions can be processed simultaneously in the pipeline, with the processing of one instruction completed during each clock cycle. Therefore, the instruction throughput of an N stage pipelined architecture is, in theory, N times greater than the throughput of a non-pipelined architecture capable of completing only one instruction every N clock cycles.

Another technique for increasing overall processor speed is "superscalar" processing. Superscalar processing calls for multiple instructions to be processed per clock cycle. Assuming that instructions are independent of one another (i.e., the execution of an instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

Processor speed may also be increased by implementing instructions that are tailored to specific tasks. For example, MMX™ instructions (MMX™ is a trademark of Intel Corporation) are used in high performance processors to change individual bytes of data within words (16 bits), double words (32 bits) and quad words (64 bits). Previously, reading and changing an individual byte within a larger group of bytes required masking out and shifting the other bytes. This required multiple processor instructions and necessarily slowed down the processor throughput. While MMX™ instructions address this problem by allowing individual bytes to be modified in a single instruction, there is still much room for improvement. It would be advantageous to be able to shift and reorder data by the byte, by the word, by the double word and by the quad word. Additionally, it would be advantageous to implement such new processor functions in a way that uses (or reuses) existing processor circuitry, thereby minimizing redesign and transistor count.

Therefore, there is a need in the art for an improved instruction set that increases overall microprocessor throughput. More particularly, there is a need in the art for improved microprocessors that can route and shift data in bytes (8 bits), words (16 bits), double words (32 bits) and quad words (64 bits). There is a still further need in the art for improved microprocessors that implement such routing and shifting functions by reusing existing microprocessor circuitry.

SUMMARY OF THE INVENTION

To address the above-discussed deficiencies of the prior art, the present invention provides for use in an x86-compatible processor capable of executing MMX™ instructions calling for partitioned data to be shifted or routed, an integrated routing and shifting circuit, a method of operation and a computer system containing the same. In one embodiment, the circuit includes: (1) a lower shifter that receives partitioned data therein and shifts at least a first portion of the partitioned data as a function of a received control signal and (2) an upper shifter/router, coupled to the lower shifter and having partitioned input lines and partitioned output lines, that receives the partitioned data from the lower shifter into the source register and selectively shifts or routes at least a second portion of the partitioned data as a function of the received control signal while transferring the partitioned data from the partitioned input lines to the partitioned output lines.

The present invention introduces the broad concept of integrating the heretofore separate functions of data shifting and routing into a single, integrated shifting and routing circuit. Such a circuit is particularly advantageous in efficiently processing multimedia instructions, such as MMX™ instructions, such as may be found in the x-86 instruction set.

In one embodiment of the present invention, the data are 64 bits (quad word) long and are partitioned into 8 bit-long bytes. Additionally, the data may be partitioned into 16 bit words or 32 bit double words. The present invention is not limited to a particular size for the data or the partitions contained therein.

In one embodiment of the present invention, the circuit further comprises a multiplexer that alternatively receives the partitioned data from the partitioned output lines of the upper shifter/router or data from an arithmetical and logical unit (ALU) of the processor. The operation of the multiplexer will be described in detail with reference to the embodiment to be set forth below.

In one embodiment of the present invention, the circuit further comprises sign extension circuitry, coupled to the upper shifter/router, that preserves a sign of the partitioned data as a function of the received control signal. As those skilled in the art understand, preservation of the sign is vital in arithmetic operations. The present invention therefore can provide sign extension circuitry that preserves the sign of the data through any shifting or routing process that may take place with respect thereto.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
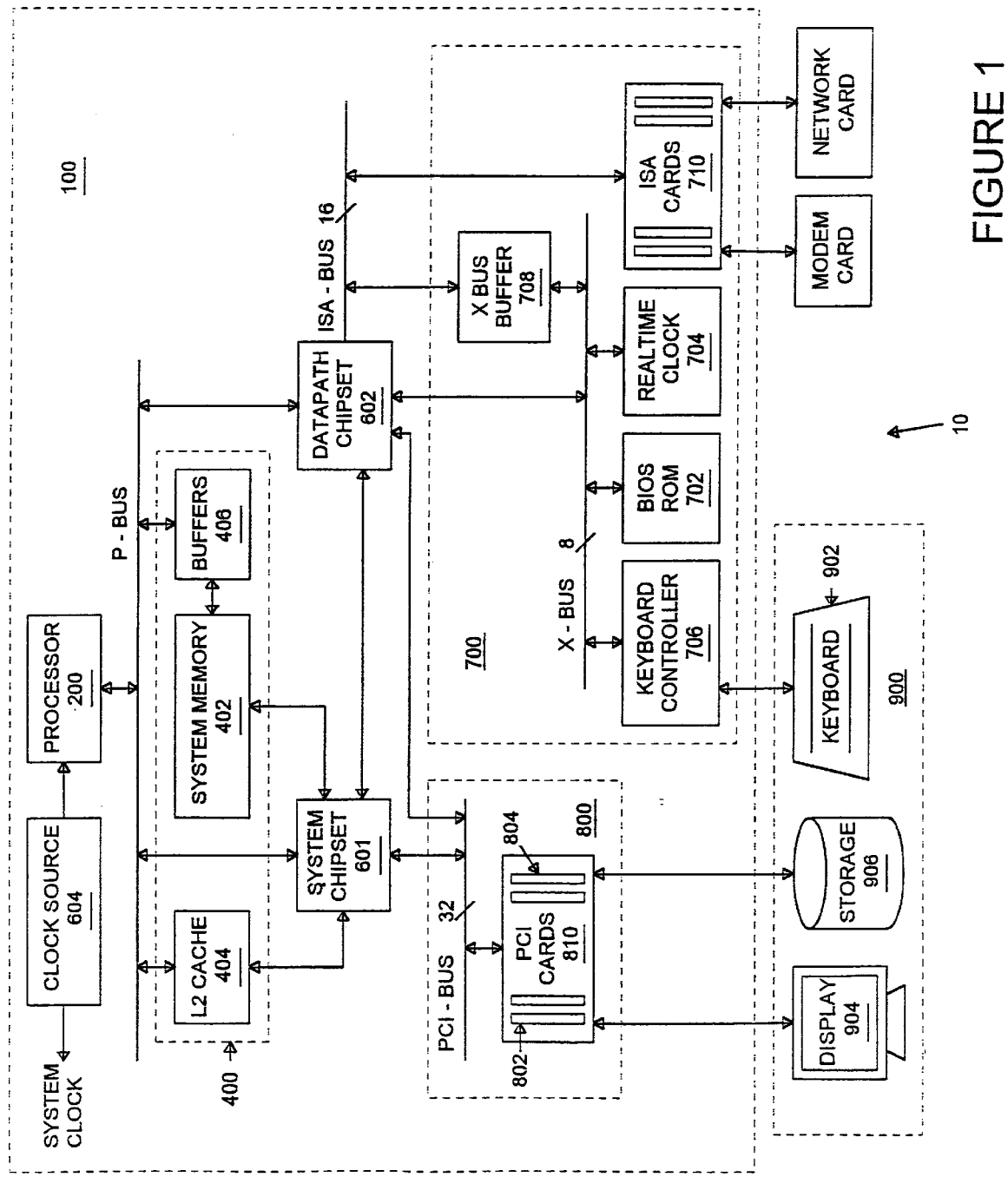
FIG. 1 is a block diagram of an exemplary system employing a processor in accordance with the principles of the present invention.

The detailed description of the preferred embodiment for the present invention is organized as follows:
1. Exemplary Computing System
2. Exemplary Processor
  2.1 Core
    2.1.1 The Integer Unit
    2.1.2 Out-of-Order Processing
    2.1.3 Pipeline Selection
    2.1.4 Register Renaming
    2.1.5 Data Forwarding
      2.1.5.1 Operand Forwarding
      2.1.5.2 Result Forwarding
    2.1.6 Data Bypassing
    2.1.7 Branch Control
    2.1.8 Speculative Execution
    2.1.9 System Register Set
      2.1.9.1 Model Specific Registers
      2.1.9.2 Debug Registers
      2.1.9.3 Test Registers
    2.1.10 The Floating Point Unit
  2.2 Cache Unit This organizational table, and the corresponding headings used in this detailed description, are provided for convenient reference and are not intended to limit the scope of the present invention. It should be understood that while the preferred embodiment is described below with respect to x86 computer architecture, it has general applicability to any architecture. Certain terms related to x86 computer architecture (such as register names, signal nomenclature, etc.), which are known to practitioners in the field of processor design, are not discussed in detail in order not to obscure the disclosure.

Moreover, certain structural details, which will be readily apparent to those skilled in the art, having the benefit of the description herein, have been illustrated in the drawings by readily understandable block representations and state/flow diagrams that show and describe details that are pertinent to the present invention. These illustrations do not necessarily represent the physical arrangement of the exemplary system, but are primarily intended to illustrate the major structural components in convenient functional groups, so that the present invention may be more readily understood. It is to be understood that other embodiments may be utilized and structural changes may be made without departing from the scope of the present invention.

1. EXEMPLARY COMPUTING SYSTEM—FIG. 1 is a block diagram of an exemplary computer system 10 employing a processor in accordance with the principles of the present invention. The exemplary computer system 10 comprises a system circuit board (a.k.a. motherboard) 100 and various peripherals and peripheral interfaces. Motherboard 100 comprises a processor 200 and memory subsystem 400 inter-coupled by a processor P-Bus (sometimes referred to as a CPU or local Bus). System logic circuitry interfaces the processor 200 to three conventional peripheral buses namely: X-Bus, PCI-Bus, and ISA-Bus. For the exemplary computer system, the P-Bus is compliant with the so-called "P55C socket."

System logic circuitry comprises a system chipset 601 and a datapath chipset 602 (sometimes referred to as a North-Bridge and South-Bridge, respectively), as well as an external clock source 604 that provides an external clock input to the processor 200 and a system clock signal to the remainder of the motherboard 100. The external clock source 604 may take on many forms without departing from the scope of the present invention, including a digital or analog phase-locked loop or delay line loop circuitry. The exact details are not necessary for understanding the present invention.

Processor 200 and the memory subsystem 400 reside on the P-Bus. The only other direct connections to the P-Bus are the system chipset 601 and the datapath chipset 602. According to the exemplary division of system logic functions, the system chipset 601 interfaces to a conventional 32-bit PCI-Bus, while the datapath chipset 602 interfaces to the 16-bit ISA-Bus and the internal 8-bit X-Bus. In alternative embodiments, a special Advanced Graphics Port (AGP) may provide an interface between the P-Bus and a graphics accelerator.

Processor 200 is coupled over the P-Bus to L2 (level 2) cache 404 and through data buffers 406 to system memory 402 (DRAM). The system chipset 601 includes control circuitry for the P-Bus, system memory 402, and the L2 cache 404. The datapath chipset 602 also interfaces to the conventional X-Bus. The X-Bus is an internal 8-bit bus that couples to the BIOS ROM 702 and the real-time clock (RTC) 704. In addition, the X-Bus connects to a conventional 8-bit keyboard controller 706.

The system and datapath chipsets 601 and 602 provide interface control for the 16-bit ISA-Bus and the 32-bit PCI-Bus. The ISA-Bus maintains compatibility with industry standard peripherals via ISA-compliant peripheral card slots 710. The PCI-Bus provides a higher performance peripheral interface via PCI-compliant peripheral card slots 810 for selected peripherals, such as a video/graphics card 802 and a storage controller 804 (which may be included as part of the system chipset 601) for interfacing to mass storage 906.

The motherboard 100 is coupled to external peripherals 900, such as keyboard 902, display 904, and mass storage 906 through the PCI-, ISA-, and X-Buses. Network and modem interconnections are provided as ISA cards, but it is to be understood that they could also be provided as PCI cards.

Figure 2:
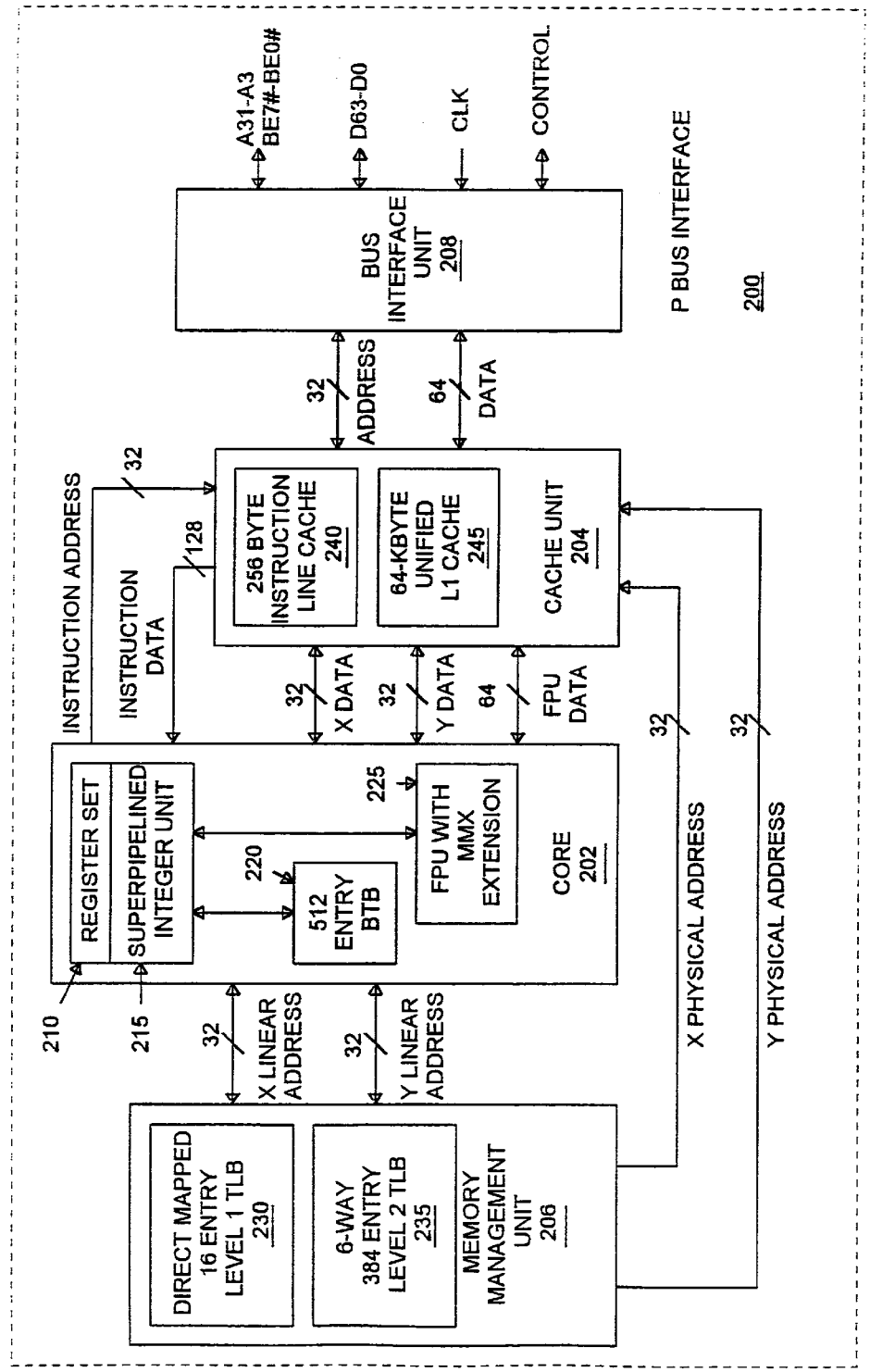
FIG. 2 is a more detailed block diagram of the processor depicted in FIG. 1, which employs cache line locking in accordance with the principles of the present invention.

2. EXEMPLARY PROCESSOR—FIG. 2 is a more detailed block diagram of the processor 200 depicted in FIG. 1, which employs cache line locking in accordance with the principles of the present invention. It is to be understood that other forms of the processor 200 may be utilized and other modifications can be made without departing from the scope and spirit of the present invention. The processor 200 consists of four major functional blocks, namely: 1) core 202, 2) cache unit 204, 3) memory management unit (MMU) 206, and 4) bus interface unit (BIU) 208.

2.1 CORE—The core 202 comprises a super-pipelined integer unit (IU) 215, a branch target buffer (BTB) 220, and a floating point unit (FPU) 225. The cache unit 204 comprises a 64 Kbyte unified L1 cache 245 that stores the most recently used data and instruction code and a 256 byte instruction line cache 240 that only stores instruction code. The MMU 206 preferably comprises two translation look-aside buffers (TLBs): a main level one (L1) TLB 230 and a larger level two (L2) TLB 235. The L1 TLB 230 is preferably direct mapped and has 16 entries to hold 42 lines. The L2 TLB 235 is preferably 6-way associative and has 384-entries to hold 384 lines.

The MMU 206 translates linear addresses supplied by the IU 215 into physical addresses, including addresses based on paging, for use by the unified L1 cache 245 and for transmission through the BIU 208. Memory management procedures are preferably x86 compatible, adhering to standard paging mechanisms. The Directory Table Entry (DTE) is stored in either the unified L1 cache in the Cache Unit 204, the L2 cache 404, or in system memory 404.

The Bus Interface Unit (BIU) provides the P-Bus interface. During a memory cycle, a memory location is selected through the address lines (A31-A3 and BE7#-BE0#) on the P-Bus. Data is passed to/from memory through the data lines (D63-D0) on the P-Bus.

The core 202 requests instructions from the cache unit 204. The received integer instructions are decoded by either the X-processing pipeline or Y-processing pipeline within the super-pipelined IU 215. If the instruction is a multimedia extension or FPU instruction, the instruction is passed to the FPU 225 for processing. As required, data is fetched from the 64 Kbyte unified L1 cache 245. If the data is not in the unified L1 cache 245, the data is accessed via the BIU 208 from either the L2 cache 404 or system memory 402.

Figure 3:
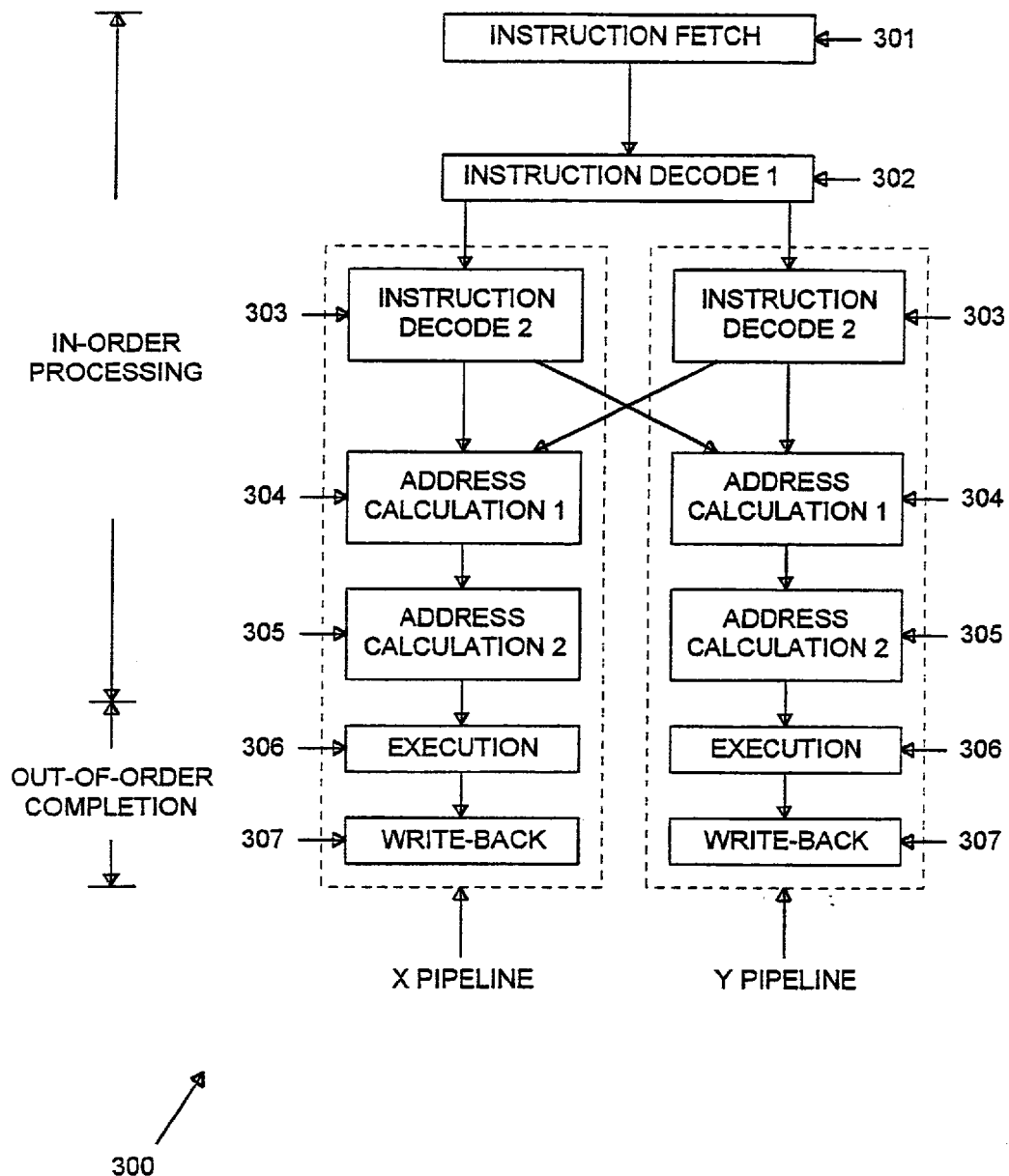
FIG. 3 is a more detailed block diagram of the pipelined stages of the Integer Unit depicted in FIG. 2.

2.1.1 THE INTEGER UNIT—FIG. 3 is a more detailed block diagram of the pipelined stages of the integer unit 215 depicted in FIG. 2. Parallel instruction execution is provided by two seven-stage integer pipelines, referred to as the X-pipeline and the Y-pipeline. Each of the X- and Y-pipelines can process several instructions simultaneously. The IU 215 comprises the following pipeline stages: Instruction Fetch (IF) 301, Instruction Decode 1 (ID1) 302, Instruction Decode 2 (ID2) 303, Address Calculation 1 (AC1) 304, Address Calculation 2 (AC2) 305, Execution 306, and Write-Back 307.

The IF 301 stage, shared by both the X- and Y-pipelines, fetches 16 bytes of code from the cache unit 204 in a single clock cycle. Within the IF 301 stage, the code stream is checked for any branch instructions that could affect normal program sequencing. If an unconditional or conditional branch is detected, branch prediction logic within the IF 301 stage generates a predicted target address for the instruction. The IF 301 stage then begins fetching instructions at the predicted address.

The super-pipelined Instruction Decode stage comprise the ID1 302 substage and ID2 303 substage. ID1, shared by both X- and Y-pipelines, evaluates the code stream provided by the IF 301 stage and determines the number of bytes in each instruction. Up to two instructions per clock are delivered to the ID2 substages, one in each pipeline.

The ID2 303 substage decodes instructions and sends the decoded instructions to either the X- or Y- pipeline for execution. The particular pipeline is chosen, based on which instructions are already in each pipeline and how fast they are expected to flow through the remaining pipe-line stages.

The Address Calculation stage comprises the AC1 304 sub-stage and the AC2 305 substage. If the instruction refers to a memory operand, the AC1 substage calculates a linear memory address for the instruction. The AC2 substage performs any required memory management functions, cache accesses, and register file accesses. If a floating point instruction is detected by the AC2 substage, the instruction is sent to the FPU 225 for processing. The Execution 306 stage executes instructions using the operands provided by the address calculation stage. The Write-Back 307 stage stores execution results either to a register file within the IU 215 or to a write buffer in the cache control unit.

2.1.2 OUT-OF-ORDER PROCESSING—If an instruction executes faster than the previous instruction in the other pipeline, the instructions may complete out of order. All instructions are processed in order, up to the Execution 306 stage. While in the Execution 306 and Write-Back 307 stages, instructions may be completed out of order. If there is a data dependency between two instructions, hardware interlocks are enforced to ensure correct program execution. Even though instructions may complete out of order, exceptions and writes resulting from the instructions are always issued in program order.

2.1.3 PIPELINE SELECTION—In most cases, instructions are processed in either pipeline and without pairing constraints on the instructions. However, certain instructions are preferably processed only in the X-pipeline, such as branch, floating point, and exclusive instructions. Branch and floating point instructions may be paired with a second instruction in the Y-pipeline. Exclusive instructions (e.g., protected mode segment loads, special control, debug, and test register accesses, string instructions, multiply and divide, I/O port accesses, push all and pop all, and inter-segment jumps, calls, and returns), which typically require multiple memory accesses, are preferably not paired with instructions in the Y-pipeline. Although exclusive instructions is are not paired, hardware from both pipelines is used to accelerate instruction completion.

When two instructions that are executing in parallel require access to the same data or register, one of the following types of data dependencies may occur: Read-After-Write (RAW), Write-After-Read (WAR), and Write-After-Write (WAW). Data dependencies typically force serial execution of instructions. However, the processor 200 employs register renaming, data forwarding, and data bypassing mechanisms that allow parallel execution of instructions containing data dependencies.

2.1.4 REGISTER RENAMING

The processor 200 includes a register file containing 32 physical general purpose registers, each of which can be temporarily assigned as one of the general purpose registers defined by the x86 architecture (EAX, EBX, ECX, EDX, ESI, EDI, EBP, and ESP). For each register write operation, a new physical register is selected to allow previous data to be retained temporarily—effectively removing WAW and WAR dependencies. The programmer does not have to consider register renaming, since register renaming is completely transparent to both the operating system and application software.

A WAR dependency exists when the first in a pair of instructions reads a logical register, and the second instruction writes to the same logical register. This type of dependency is illustrated by the pair of instructions shown below. In this and the following examples the original instruction order is shown in parentheses.

| X-PIPELINE | Y-PIPELINE |
|---|---|
| (1) MOV BX, AX | (2) ADD AX, CX |
| BX←AX | AX←AX + CX |

In the absence of register renaming, the ADD instruction in the Y-pipeline would have to be stalled to allow the MOV instruction in the X-pipeline to read the AX register. The processor 200, however, can avoid the Y-pipeline stall, as shown below in Table 1. As each instruction executes, the results are placed in new physical registers to avoid the possibility of overwriting a logical register value and to allow the two instructions to complete in parallel (or out of order) rather than in sequence.

TABLE 1

Register Renaming with WAR Dependency

| Instruction | Reg0 | Reg1 | Reg2 | Reg3 | Reg4 | Pipe | Action |
|---|---|---|---|---|---|---|---|
| (Initial) | AX | BX | CX | | | | |
| MOV BX, AX | AX | | CX | BX | | X | Reg3←Reg0 |
| ADD AX, CX | | | CX | BX | AX | Y | Reg4←Reg0 + Reg2 |

The representations of the MOV and ADD instructions in the final column of Table 1 are completely independent.

A WAW dependency occurs when two consecutive instructions perform write operations to the same logical register. This type of dependency is illustrated by the pair of instructions shown below:

| X-PIPELINE | Y-PIPELINE |
|---|---|
| (1) ADD, AX, BX | (2) MOV AX, [mem] |
| AX←AX + BX | AX←[mem] |

Without register renaming, the MOV instruction in the Y-pipeline would have to be stalled to guarantee that the ADD instruction in the X-pipeline would first write its results to the AX register. The processor 200, however, can avoid the Y-pipeline stall, as shown below in Table 2. The contents of the AX and BX registers are placed in physical registers. As each instruction executes, the results are placed in new physical registers to avoid the possibility of overwriting a logical register value and to allow the two instructions to complete in parallel (or out of order) rather than in sequence. All subsequent reads of the logical register AX will refer to Reg3, the result of the MOV instruction.

TABLE 2

Register Renaming with WAW Dependency

| Instruction | Reg0 | Reg1 | Reg2 | Reg3 | Pipe | Action |
|---|---|---|---|---|---|---|
| (Initial) | AX | BX | | | | |
| ADD AX, BX | | BX | AX | | X | Reg2←Reg0 + Reg1 |
| MOV AX, [mem] | | BX | | AX | Y | Reg3←[mem] |

2.1.5 DATA FORWARDING

The processor 200 uses two types of data forwarding in conjunction with register renaming to eliminate RAW dependencies, namely, operand forwarding and result forwarding. Operand forwarding takes place when the first in a pair of instructions performs a move from register or memory, and the data that is read by the first instruction is required by the second instruction. The processor performs the read operation and makes the data read available to both instructions simultaneously. Result forwarding takes place when the first in a pair of instructions performs an operation (such as an ADD) and the result is required by the second instruction to perform a move to a register or memory. The processor 200 performs the required operation and stores the results of the operation to the destination of both instructions simultaneously.

2.1.5.1 OPERAND FORWARDING

A RAW dependency occurs when the first in a pair of instructions performs a write, and the second instruction reads the same register. This type of dependency is illustrated by the pair of instructions shown below in the X-and Y-pipelines:

| X-PIPELINE | Y-PIPELINE |
|---|---|
| (1) MOV AX, [mem] | (2) ADD BX, AX |
| AX←[mem] | BX←AX + BX |

The processor 200, however, can avoid the Y-pipeline stall, as shown below in Table 3. Operand forwarding allows simultaneous execution of both instructions by first reading memory and then making the results available to both pipelines in parallel. Operand forwarding can only occur if the first instruction does not modify its source data. In other words, the instruction is a move type instruction (for example, MOV, POP, LEA). Operand forwarding occurs for both register and memory operands. The size of the first instruction destination and the second instruction source must match.

TABLE 3

Example of Operand Forwarding

Physical Register Contents

| Instruction | Reg0 | Reg1 | Reg2 | Reg3 | Pipe | Action |
|---|---|---|---|---|---|---|
| (Initial) | AX | BX | | | | |
| MOV AX, [mem] | | BX | AX | | X | Reg2←Reg2 + [mem] |
| MOV AX, [mem] | | | AX | BX | Y | Reg3←[mem] + Reg1 |

2.1.5.2 RESULT FORWARDING—A RAW dependency can occur when the first in a pair of instructions performs a write, and the second instruction reads the same register. This dependency is illustrated by the pair of instructions in the X-and Y-pipelines, as shown below:

| X-PIPELINE | Y-PIPELINE |
|---|---|
| (1) ADD AX, BX | (2) MOV [mem], AX |
| AX←AX + BX | [mem]←AX |

The processor 200, however, can use result forwarding to avoid the Y-pipeline stall, as shown below in Table 4. Instead of transferring the contents of the AX register to memory, the result of the previous ADD instruction (Reg0+Reg1) is written directly to memory, thereby saving a clock cycle. The second instruction must be a move instruction and the destination of the second instruction may be either a register or memory.

TABLE 4

Result Forwarding Example

Physical Register Contents

| Instruction | Reg0 | Reg2 | Reg2 | Pipe | Action |
|---|---|---|---|---|---|
| (Initial) | AX | BX | | | |
| ADD AX, BX | | BX | AX | X | Reg2←Reg0 + Reg1 |
| MOV [mem], AX | | BX | AX | Y | [mem]←Reg0 + Reg1 |

2.1.6 DATA BYPASSING—In addition to register renaming and data forwarding, the processor 200 provides a third data dependency-resolution technique called data bypassing. Data bypassing reduces the performance penalty of those memory data RAW dependencies that cannot be eliminated by data forwarding. Data bypassing is provided when the first in a pair of instructions writes to memory and the second instruction reads the same data from memory. The processor retains the data from the first instruction and passes it to the second instruction, thereby eliminating a memory read cycle. Data bypassing only occurs for cacheable memory locations.

A RAW dependency occurs when the first in a pair of instructions performs a write to memory and the second instruction reads the same memory location. This dependency is illustrated by the pair of instructions in the X-and Y-pipelines, as shown below.

| X-PIPELINE | Y-PIPELINE |
|---|---|
| (1)ADD [mem], AX | (2)SUB BX, [mem] |
| [mem]←[mem] + AX | BX←BX-[mem] |

The processor 200 can use data bypassing to stall the Y-pipeline for only one clock cycle by eliminating the Y-pipeline's memory read cycle, as shown below in Table 5. Instead of reading memory in the Y-pipeline, the result of the previous instruction ([mem]+Reg0) is used to subtract from Reg1, thereby saving a memory access cycle.

TABLE 5

Example of Data Bypassing

Physical Register Contents

| Instruction | Reg0 | Reg1 | Reg2 | Pipe | Action |
|---|---|---|---|---|---|
| (Initial) | AX | BX | | | |
| ADD [mem], AX | AX | BX | | X | [mem]←[mem] + Reg0 |
| SUB BX, [mem] | AX | | BX | Y | Reg2←Reg1-{[mem] + Reg0} |

2.1.7 BRANCH CONTROL—Programmers have found through simulation and experimentation that branch instructions occur on average every four to six instructions in x86-compatible programs. The processor 200 minimizes performance degradation and latency of branch instructions through the use of branch prediction and speculative execution. The processor 200 uses a 512-entry, 4-way set associative Branch Target Buffer (BTB) 220 to store branch target addresses and a 1024-entry branch history table. During the fetch stage, the instruction stream is checked for the presence of branch instructions. If an unconditional branch instruction is encountered, the processor 200 accesses the BTB 220 to check for the branch instruction's target address. If the branch instruction's target address is found in the BTB 220, the processor 200 begins fetching at the target address specified by the BTB 220.

In case of conditional branches, the BTB 220 also provides history information to indicate whether the branch is more likely to be taken or not taken. If the conditional branch instruction is found in the BTB 220, the processor 200 begins fetching instructions at the predicted target address. If the conditional branch misses in the BTB 220, the processor 200 predicts that the branch will not be taken, and instruction fetching continues with the next sequential instruction. The decision to fetch the taken or not taken target address is preferably, although not necessarily, based on a four-state branch prediction algorithm.

Once fetched, a conditional branch instruction is first decoded and then dispatched to the X-pipeline only. The conditional branch instruction proceeds through the X-pipeline and is then resolved in either the Execution 306 stage or the Write-Back 307 stage. The conditional branch is resolved in the Execution 306 stage if the instruction responsible for setting the condition codes is completed prior to the execution of the branch. If the instruction that sets the condition codes is executed in parallel with the branch, the conditional branch instruction is resolved in the Write-Back 307 stage.

Correctly predicted branch instructions execute in a single core clock cycle. If resolution of a branch indicates that a misprediction has occurred, the processor 200 flushes the pipeline and starts fetching from the correct target address. The processor 200 preferably prefetches both the predicted and the non-predicted path for each conditional branch, thereby eliminating the cache access cycle on a misprediction. If the branch is resolved in the Execution 306 stage, the resulting misprediction latency is four clock cycles. If the branch is resolved in the Write-Back 307 stage, the latency is five clock cycles.

Since the target address of return (RET) instructions is dynamic rather than static, the processor 200 caches target addresses for RET instructions in an eight-entry return stack rather than in the BTB 220. The return address is pushed on the return stack during a CALL instruction and popped during the corresponding RET instruction.

2.1.8 SPECULATIVE EXECUTION—The processor 200 is capable of speculative execution following a floating point instruction or predicted branch. Speculative execution allows the X- and Y-pipelines to continuously execute instructions following a branch without stalling the pipelines waiting for branch resolution. As will be described below, the same mechanism is used to execute floating point instructions in parallel with integer instructions. The processor 200 is capable of up to four levels of speculation (i.e., combinations of four conditional branches and floating point operations). After generating the fetch address using branch prediction, the processor 200 checkpoints the machine state (registers, flags, and processor environment), increments the speculation level counter, and begins operating on the predicted instruction stream.

Once the branch instruction is resolved, the processor 200 decreases the speculation level. For a correctly predicted branch, the status of the checkpointed resources is cleared. For a branch misprediction, the processor 200 generates the correct fetch address and uses the checkpointed values to restore the machine state in a single clock. In order to maintain compatibility, writes that result from speculatively executed instructions are not permitted to update the cache or external memory until the appropriate branch is resolved. Speculative execution continues until one of the following conditions occurs: 1) a branch or floating point operation is decoded and the speculation level is already at four; 2) an exception or a fault occurs; 3) the write buffers are full; or 4) an attempt is made to modify a non-checkpointed resource (i.e., segment registers, system flags).

2.1.9 SYSTEM REGISTER SET—Registers are broadly grouped into two sets, namely: 1) the application register set comprising registers frequently used by application programs, and 2) the system register set comprising registers typically reserved for use by operating system programs. The application register set preferably includes general purpose registers, segment registers, a flag register, and an instruction pointer register. The system register set preferably includes control registers, system address registers, debug registers, configuration registers, and test registers. In order not to obscure the invention, only relevant portions of the system register set will be further described. Those skilled in the art may easily obtain additional descriptions of the application register set by referring to publications such as "The Cyrix 6x86 Microprocessor Data Book," Order No. 94175-00, August 1995, herein incorporated by reference.

Figure 4A:
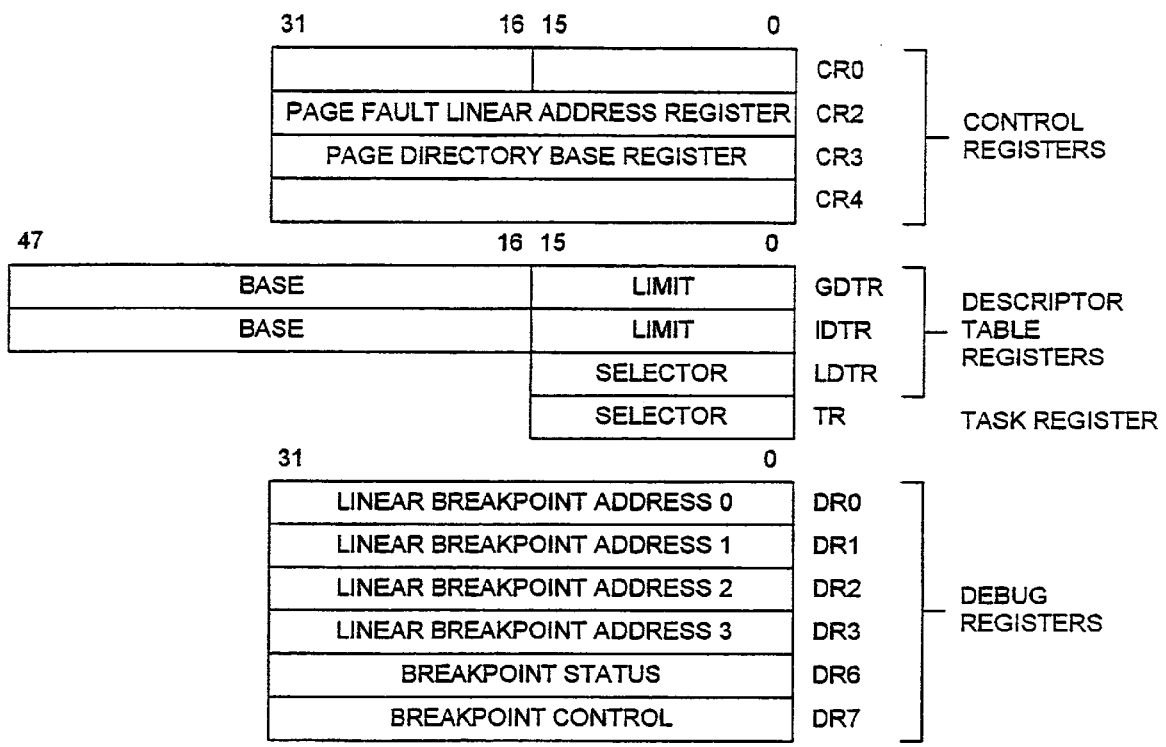
FIGS. 4A and 4B depict a preferred system register set, comprising registers not generally visible to application programmers and typically employed by operating systems and memory management programs.
Figure 4B:
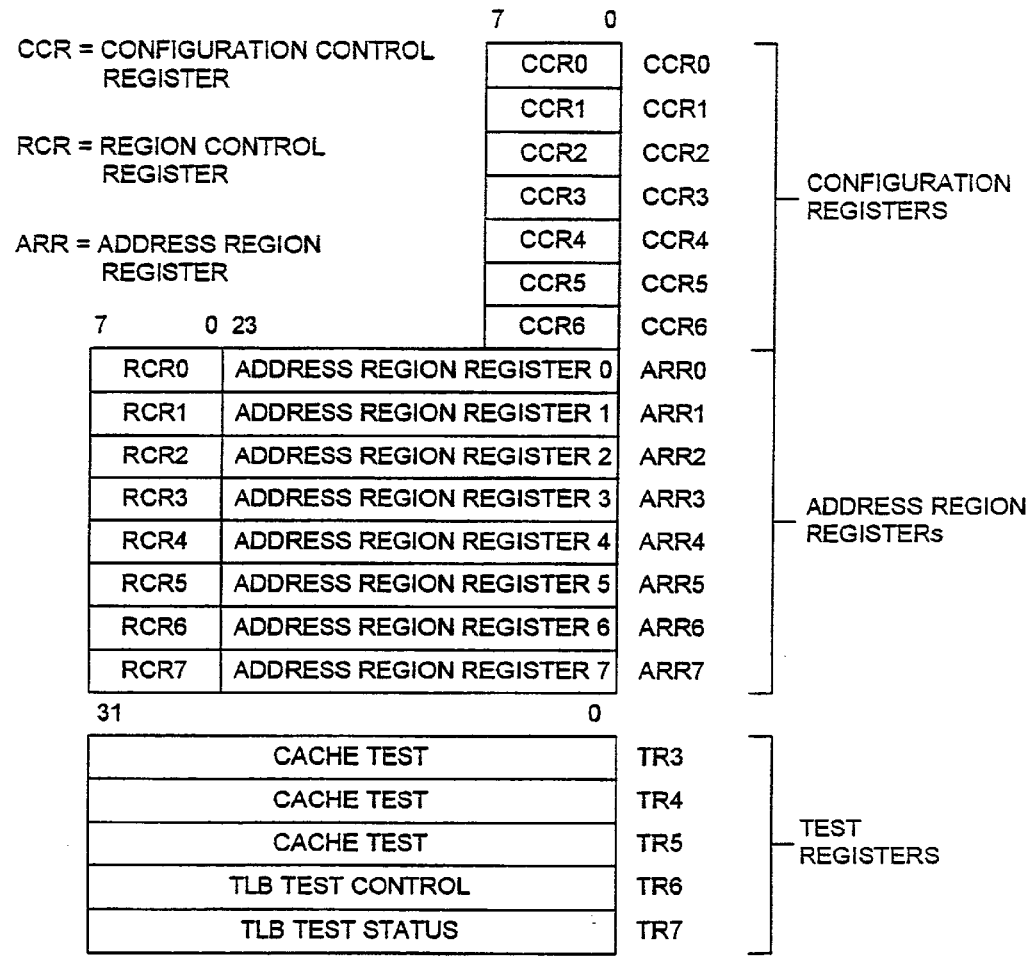

FIGS. 4A and 4B depict a preferred system register set 400, comprising registers not generally visible to application programmers and typically employed by operating systems and memory management programs. The control registers, CR0–CR4, control certain aspects of the processor 200 such as paging, coprocessor functions, and segment protection. The debug registers, DR0–DR7, provide debugging facilities to enable the use of data access break-points and code execution breakpoints. The test registers, TR3–TR7, provide a mechanism to test the contents of both the cache unit 204 and the Translation Look-Aside Buffers, TLB 230 and TLB 235. The configuration control registers, CCR0–CCR7, are used to configure the processor 200's on-chip cache operations, power management features, and System Management Mode, as well as provide information on device type and revision.

The address region registers, ARR0–ARR7, are used to specify the location and size for the eight address regions. Attributes for each address region are specified in the region control registers, RCR0–RCR7. ARR7 and RCR7 are used to define system main memory and differ from ARR0–ARR6 and RCR0–RCR6. With non-cacheable regions defined on-chip, the processor 200 eliminates data dependencies and resource conflicts in its execution pipelines. If KEN# is active for accesses to regions defined as non-cacheable by the RCRs, the region is not cached.

A register index, is used to select one of three bytes in each ARRx. The starting address of the ARRx address region, selected by the START ADDRESS field, must be on a block size boundary. For example, a 128 Kbyte block is allowed to have a starting address of 0 Kbytes, 128 Kbytes, 256 Kbytes, and so on.

The region control registers, RCR0–RCR7, specify the attributes associated with the ARRx address regions. Cacheability, weak locking, write gathering, and cache-write-through policies can be activated or deactivated using the attribute bits defined in the region control registers.

2.1.9.1 MODEL SPECIFIC REGISTERS—The processor 200 preferably comprises at least four model specific registers (MSRs) The MSRs can be read using the RDMSR instruction. During a register read, the contents of the particular MSR, specified by the ECX register, is loaded into the EDX:EAX registers. The MSR can be written using the WRMSR instruction. During a MSR write the contents of EDX:EAX are loaded into the MSR specified in the register.

2.1.9.2 DEBUG REGISTER—At least six debug registers, DR0–DR3, DR6 and DR7, support debugging on the processor 200. Memory addresses loaded in the debug registers, referred to as "breakpoints," generate a debug exception when a memory access of the specified type occurs to the specified address. A data breakpoint can be specified for a particular kind of memory access, such as a read or a write. Code breakpoints can also be set allowing debug exceptions to occur whenever a given code access (execution) occurs. The size of the debug target can be set to 1, 2, or 4 bytes. The debug registers are accessed via MOV instructions, which can be executed only at privilege level 0. The Debug Address Registers (DR0–DR3) each contain the linear address for one of four possible breakpoints. Each breakpoint is further specified by bits in the Debug Control Register (DR7). For each breakpoint address in DR0–DR3, there are corresponding fields L, R/W, and LEN in DR7 that specify the type of memory access associated with the breakpoint.

The R/W field can be used to specify instruction execution as well as data access break-points. Instruction execution breakpoints are always taken before execution of the instruction that matches the breakpoint.

The Debug Status Register (DR6) reflects conditions that were in effect at the time the debug exception occurred. The contents of the DR6 register are not automatically cleared by the processor 200 after a debug exception occurs and, therefore, should be cleared by software at the appropriate time. Code execution breakpoints may also be generated by placing the breakpoint instruction (INT 3) at the location where control is to be regained. Additionally, the single-step feature may be enabled by setting the TF flat in the EFLAGS register. This causes the processor to perform a debug exception after the execution of every instruction.

2.1.9.3 TEST REGISTERS—The test registers can be used to test the unified L1 cache 245 and the L1 TLB 230. Test registers TR3, TR4, and TR5 are used to test the unified L1 cache 245 and TR6 and TR7 are used to test the L1 TLB 230. Use of these test registers is described in more detail below.

2.1.10 FLOATING POINT UNIT—The floating point unit (FPU) 225 processes floating point and multimedia extension instructions and is preferably x87 instruction set compatible, adhering to the IEEE-754 standard. Floating point instructions may execute in parallel with integer instructions. Integer instructions may complete out-of-order with respect to the FPU instructions. The processor 200 maintains x86 compatibility by signaling exceptions and issuing write cycles in program order. Floating point instructions are preferably dispatched to the X-pipeline in the IU 215. The address calculation stage of the X-pipeline checks for memory management exceptions and accesses memory operands used by the FPU 225. If no exceptions are detected, the state of the processor 200 is check-pointed and, during AC2, floating point instructions are dispatched to a FPU instruction queue. The processor 200 can then complete subsequent integer instructions speculatively and out-of-order relative to the FPU instruction and relative to any potential FPU exceptions which may occur.

As additional FPU instructions enter the pipeline, the processor 200 can preferably dispatch four or more FPU instructions to the FPU instruction queue. The processor 200 continues executing speculatively and out-of-order, relative to the FPU queue, until one of the conditions that causes speculative execution to halt is encountered. As the FPU 225 completes instructions, the speculation level decreases and the check-pointed resources are available for reuse in subsequent operations. The FPU 225 preferably has a set of six or more write buffers to prevent stalls due to speculative writes.

Figure 5:
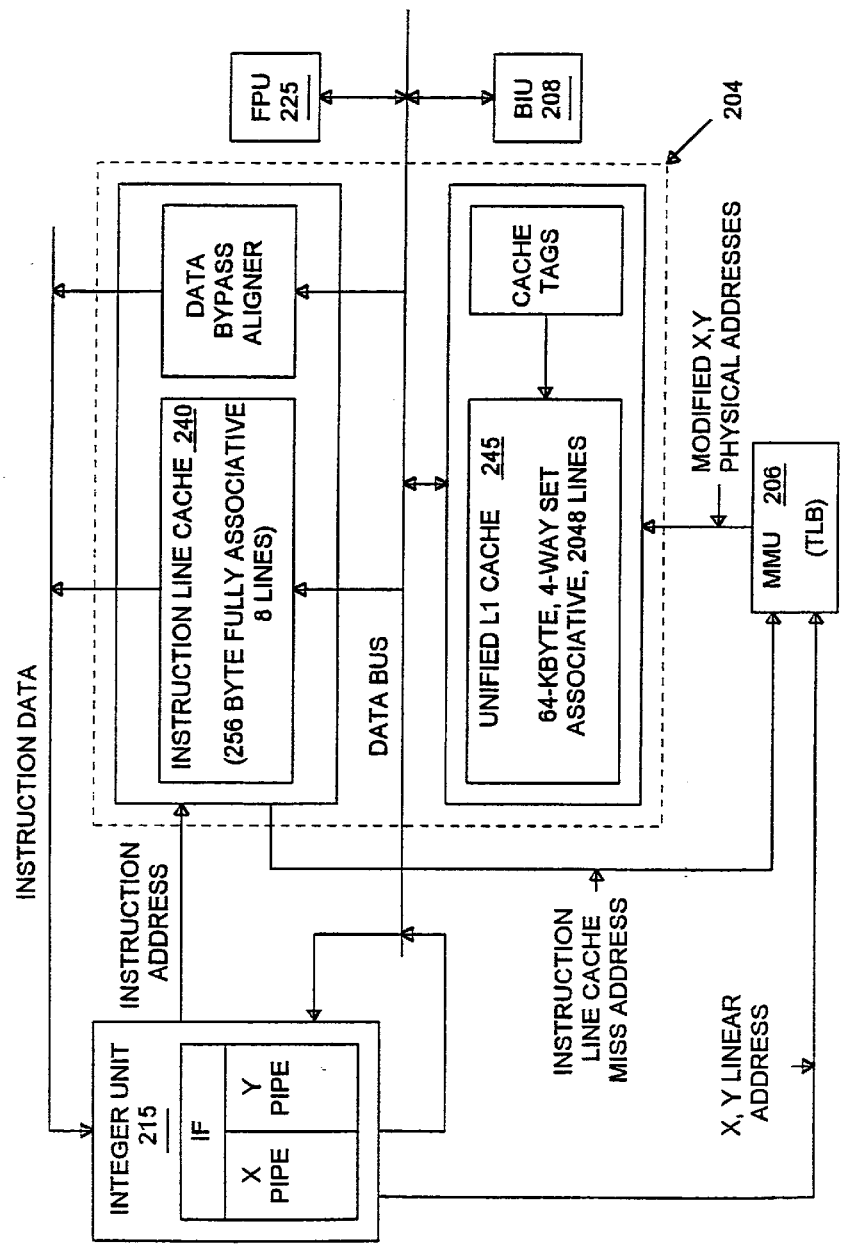
FIG. 5 depicts an exemplary cache unit in accordance with the principles of the present invention.

2.2 CACHE UNIT—FIG. 5 depicts an exemplary cache unit 204 in accordance with the principles of the present invention. Those skilled in the art will readily understand that other organizations, sizes and associativities for the cache unit 204 are possible, for which the principles of the present invention may be practiced without departing from the scope of the invention. The cache unit 204 comprises a unified L1 cache 245 and an instruction line cache 240. The unified L1 cache 245 is the primary data cache and secondary instruction cache. The unified L1 cache 245 is preferably, although not exclusively, 64 Kbytes in size and four-way set-associative with a 32 byte line size (2048 lines total).

The instruction line cache 240 is the primary instruction cache, provides a high speed instruction stream to the IU 215, and is preferably, though not exclusively, 256 bytes in size and fully associative. The instruction line cache 240 is filled from the unified L1 cache 245 through the data bus. Fetches from the IU 215 that hit in the instruction line cache 240 do not access the unified L1 cache 245. If an instruction line cache miss occurs, the instruction line data from the unified L1 cache 245 is transferred simultaneously to the instruction line cache 240 and the IU 215. The instruction line cache 240 uses a pseudo-LRU replacement algorithm. To ensure proper operation in the case of self-modifying code, any writes to the unified L1 cache 245 are checked against the contents of the instruction line cache 240. If a hit occurs in the instruction line cache 240, the appropriate line is invalidated.

The FPU 225, the IU 215 and the register set 210 contain circuitry for executing various logic and arithmetic functions on pieces of data by the word (16 bits), by the double word (32 bits) and by the quad word (64 bits). These functions are principally implemented as MMX™ instructions in the FPU 225. These functions generally allow a word or double word to be directly read and/or modified within a quad word, rather than by reading the entire quad word and then masking and shifting in order to read/modify the desired subset of bits.

The present invention improves upon standard microprocessor instructions by providing shifting instructions operable to shift data by the byte (8 bit shift), by the word (16 bit shift), by the double word (32 bit shift), and by the quad word (64 bit shift). The shifting operations include right shift and left shift instructions for both logical operations and arithmetic operations, which must maintain the sign bit. The present invention further improves upon standard microprocessor instructions by providing "routing" instructions operable to transfer a byte of data at a first position in a word, double word, or quad word to any other position in the word, double word or quad word.

Figure 6:
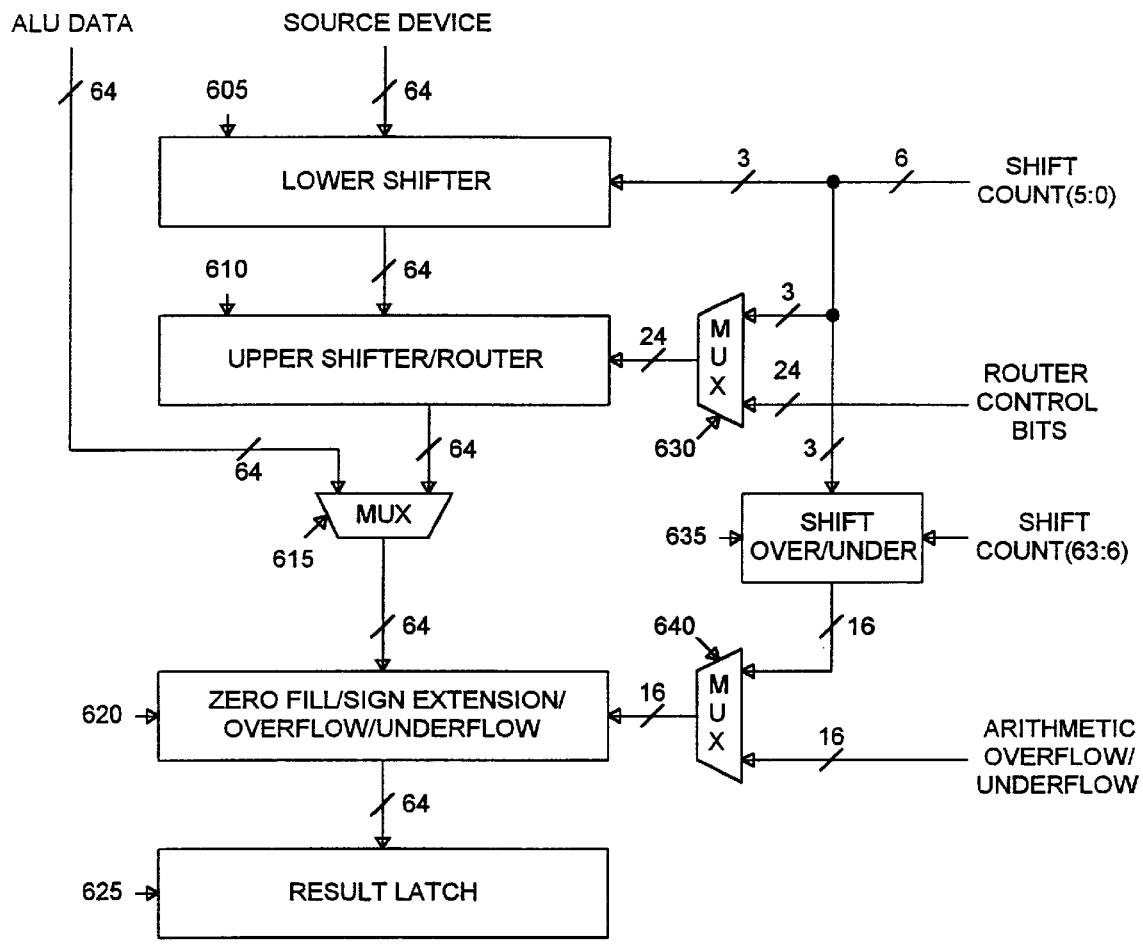
FIG. 6 depicts an integrated routing and shifting circuit according to one embodiment of the present invention.

FIG. 6 depicts an integrated routing and shifting circuit 600 according to one embodiment of the present invention. The initial stages of integrated routing and shifting circuit 600 comprise a lower shifter 605 and an upper shifter/router 610. The lower shifter 605 receives 64 bits of data from any source register (not shown) in the processor 200, including the register set 210, IU 215, FPU 225, etc. The 64 bits in lower shifter 605 are partitioned into eight partitions of eight bits each. The lower shifter 605 receives three control bits, SHIFT COUNT (2:0), from control signal, SHIFT COUNT (5:0).

Control bits SHIFT COUNT (2:0) have a value from 000 to 111 (0 to 7), which value determines the number of bit positions that each partition will be shifted. For example, if a logical right shift operation is being performed and SHIFT COUNT (2:0) is 011, then all partitions will be shifted 3 bit positions to the right. Zeroes are shifted into the upper three bits in a logical right shift operation. If an arithmetic right shift operation is being performed and SHIFT COUNT (2:0) is 011, then all partitions will be shifted 3 bit positions to the right. However, the value of sign in the highest bit position will be preserved and also will be shifted into the remainder of the upper three bit positions.

The 64 shifted bits in lower shifter 605 are then transferred to upper shifter/router 610 for further manipulation. The 64 input lines on upper shifter/router 610 are partitioned into eight partitions of eight input lines each. The 64 output lines on upper shifter/router 610 are also partitioned into eight partitions of eight output lines each. The upper shifter/router 610 contains a complex but conventional switching matrix, such as a multiplexer tree, that can route any byte from one partition on the input lines to any partition on the output lines. The type of shifting/routing performed by upper shifter/router 610 is determined by 24 control bits received from multiplexer 630.

During a routing operation, multiplexer 630 selects a first data channel comprising 24 input bits that receives 24 ROUTER CONTROL bits organized into eight 3-bit groups. The three bit groups have values between 000 and 111. Each three bit group represents the destination partition for one of the eight source partitions. Hence, the contents of any source partition may be routed to any destination partition, although no two source partitions may be routed to the same destination partition. However, any source partition can be routed to multiple destination partitions.

During a shifting operation, the multiplexer 630 selects a second data channel comprising 24 input bits. Each of the three bits in SHIFT COUNT (3:5) is fanned across eight of the 24 input pins in the second data channel, so that the second data channel receives eight copies of SHIFT COUNT (3:5). Thus, the 24 output bits of the multiplexer 630 are eight copies of SHIFT COUNT (3:5).

In this way, each partition receives an identical value of SHIFT COUNT (3:5). The three bit groups have values between 000 and 111. During a shifting operation, however, the partitions interpret SHIFT COUNT (3:5) as a shift amount, not as a destination partition.

The routing and shifting functions of the present invention may advantageously be combined with the existing zero fill, sign extension, overflow and underflow circuitry 620 (hereafter, "ZSOU circuitry 620") of processor 200. The operation of ZSOU circuitry 620 is generally well-known. The Zero Fill function is used to fill some or all of the bit positions with leading zeroes. The Sign Extension function shifts ("extends") the sign bit to the leftmost (i.e., most significant) bit position when, for example, a 32-bit double word is changed to a 64-bit quad word, thereby preserving the sign of the number. The Overflow/Underflow function forces a maximum/minimum signed/unsigned data value into the output whenever saturation occurs as a result of an arithmetic function.

Multiplexer 615 may select a first data channel which receives the 64 bit output of upper shifter/router 610. Alternatively, multiplexer 615 may select a second data channel that receives 64 data bits from any of the mathematical or logical devices (not shown) in the IU 215 and the FPU 225, referred to generically as "ARITHMETICAL AND LOGICAL UNIT (ALU) DATA" in FIG. 7.

Depending of the results of an arithmetic operation, the received ALU DATA bits may have ARITHMETIC OVERFLOW/UNDERFLOW data bits associated therewith. During an arithmetic operation that does not use the shifting/routing functions of the present invention, multiplexer 640 selects a first channel that receives sixteen ARITHMETIC OVERFLOW/UNDERFLOW bits from the corresponding ALU device. ZSOU circuitry 620 is partitioned into eight partitions of eight bits each. Since the external ALU circuitry that causes an overflow/underflow condition may have performed an 8-bit, 16-bit, 32-bit, or 64-bit operation, overflow and underflow conditions may occur in any partition. Therefore, each partition has associated therewith one ARITHMETIC OVERFLOW bit and one ARITHMETIC UNDERFLOW bit.

During a shifting operation, multiplexer 640 selects a second channel that receives sixteen bits from shift over/under unit 635. As in the case of an arithmetic operation, each partition in the ZSOU circuitry 620 has associated therewith two of sixteen overflow/underflow bits that are received from shift over/under unit 635. The overflow/underflow bits are derived from the control signal, SHIFT COUNT (63:6). Based upon the value of SHIFT COUNT and the type of operation, the shift over/under unit 635 sets the overflow/underflow functions in the ZSOU circuitry 620 to force individual partition outputs to all ones (11111111) or all zeroes (00000000). This performs sign extension and zero fill for the shifter functions. Finally, the output of the ZSOU circuitry 620 is stored in a result latch 625.

The following are exemplary functions that may be performed by the integrated routing and shifting circuit 600 of the present invention:

PACKSSDW: Pack double word to word with signed saturation.
PACKSSWB: Pack word to byte with signed saturation.
PACKUSWB: Pack word to byte with unsigned saturation.
PUNPCKHBW: Unpack high byte to word.
PUNPCKHDQ: Unpack high double word to quad word.
PUNPCHWD: Unpack high word to double word.
PUNPCKLBW: Unpack low byte to word.
PUNPCKLDQ: Unpack low double word to quad word.
PUNPCKLWD: Unpack low word to double word.

Additionally, the present invention implements a new instruction, ROUTE(Destination,Source,24-bit Immediate Route Control), that routes any input partition to any output partition.

Although the present invention has been described in detail, those skilled in the art should understand that they can make various changes, substitutions and alterations herein without departing from the spirit and scope of the invention in its broadest form.

What is claimed is:

1. For use in an x86-compatible processor capable of executing single instruction, multiple data (SIMD) instructions calling for partitioned data to be shifted or routed, an integrated routing and shifting circuit, comprising:

a lower shifter that receives partitioned data in parallel therein and shifts at least a first portion of said partitioned data as a function of a received control signal; and an upper shifter/router, coupled to said lower shifter and having partitioned input lines and partitioned output lines, that receives said partitioned data from said lower shifter on said partitioned input lines and selectively shifts or routes at least a second portion of said partitioned data as a function of said received control signal while transferring said partitioned data from said partitioned input lines to said partitioned output lines.

2. The circuit as recited in claim 1 wherein said data are 64 bits long and are partitioned into bytes.

3. The circuit as recited in claim 1 further comprising a multiplexer that alternatively receives said partitioned data from said partitioned output lines of said upper shifter/router or data from an arithmetical and logical unit (ALU) of said processor.

4. The circuit as recited in claim 1 further comprising sign extension circuitry, coupled to said upper shifter/router, that preserves a sign of said partitioned data as a function of said received control signal.

5. For use in an x86-compatible processor capable of executing single instruction, multiple data (SIMD) instructions calling for partitioned data to be shifted or routed, an integrated routing and shifting circuit, comprising:

first means for receiving partitioned data in parallel and shifting at least a first portion of said partitioned data as a function of a received control signal; and second means, coupled to said first means, for selectively shifting or routing at least a second portion of said partitioned data as a function of said received control signal while transferring said partitioned data between partitioned input lines and partitioned output lines of said second means.

6. The circuit as recited in claim 5 wherein said data are 64 bits long and are partitioned into bytes.

7. The circuit as recited in claim 5 further comprising means for alternatively receiving said partitioned data from said partitioned output lines of said upper shifter/router or data from an arithmetical and logical unit (ALU) of said processor.

8. The circuit as recited in claim 5 further comprising means for preserving a sign of said partitioned data as a function of said received control signal.

9. For use in an x86-compatible processor capable of executing single instruction, multiple data (SIMD) instructions calling for partitioned data to be shifted or routed, a method of routing and shifting said partitioned data in an integrated routing and shifting circuit, comprising the steps of:

receiving said partitioned data in parallel into a lower shifting circuit; shifting at least a first portion of partitioned data in said shifting circuit as a function of a received control signal;

receiving said partitioned data from said lower shifting circuit into an upper shifting/routing circuit having partitioned input lines and partitioned output lines; and selectively shifting or routing at least a second portion of said partitioned data as a function of said received control signal while transferring said partitioned data from said partitioned input lines to said partitioned output lines.

10. The method as recited in claim 9 wherein said data are 64 bits long and are partitioned into bytes.

11. The method as recited in claim 9 further comprising the step of alternatively receiving said partitioned data from said partitioned output lines of said upper shifter/router or data from an arithmetical and logical unit (ALU) of said processor.

12. The method as recited in claim 9 further comprising the step of preserving a sign of said partitioned data as a function of said received control signal.

13. A computer system, comprising:

(a) a pipelined, x86-compatible processor having at least one execution pipeline for executing instructions, said execution pipeline including ID (decode), AC (address calculation), and EX (execution) processing stages;

(b) system memory for storing instructions including single instruction, multiple data (SIMD) instructions that shift or route partitioned data;

(c) said processor including instruction fetch logic that fetches said single instruction, multiple data (SIMD) instructions from said system memory; and (d) said processor further including an integrated routing and shifting circuit, including:

(i) a lower shifter that receives partitioned data in parallel therein and shifts at least a first portion of said partitioned data as a function of a received control signal, and (ii) an upper shifter/router, coupled to said lower shifter and having partitioned input lines and partitioned output lines, that receives said partitioned data from said lower shifter into said input lines and selectively shifts or routes at least a second portion of said partitioned data as a function of said received control signal while transferring said partitioned data from said partitioned input lines to said partitioned output lines.

14. The system as recited in claim 13 wherein said data are 64 bits long and are partitioned into bytes.

15. The system as recited in claim 13 further comprising an arithmetical and logical unit (ALU) and wherein said circuit further comprises a multiplexer that alternatively receives said partitioned data from said partitioned output lines of said upper shifter/router or data from said ALU.

16. The system as recited in claim 13 wherein said circuit further comprises sign extension circuitry, coupled to said upper shifter/router, that preserves a sign of said partitioned data as a function of said received control signal.

17. A method of operating a computer system, comprising the steps of:

(a) applying power to a pipelined, x86-compatible processor having at least one execution pipeline for executing instructions, said execution pipeline including ID (decode), AC (address calculation), and EX (execution) processing stages;

(b) storing instructions in system memory, said instructions including single instruction, multiple data (SIMD) instructions that shift or route partitioned data;

(c) fetching said single instruction, multiple data (SIMD) instructions from said system memory; and (d) executing said single instruction, multiple data (SIMD) instructions in said processor, said processor further including an integrated routing and shifting circuit, including:

(i) a lower shifter that receives partitioned data in parallel therein and shifts at least a first portion of said partitioned data as a function of a received control signal; and (ii) an upper shifter/router, coupled to said lower shifter and having partitioned input lines and partitioned output lines, that receives said partitioned data from said lower shifter on said partitioned input lines and selectively shifts or routes at least a second portion of said partitioned data as a function of said received control signal while transferring said partitioned data from said partitioned input lines to said partitioned output lines.

18. The method as recited in claim 17 wherein said data are 64 bits long and are partitioned into bytes.

19. The method as recited in claim 17 wherein said circuit further includes a multiplexer that alternatively receives said partitioned data from said partitioned output lines of said upper shifter/router or data from an arithmetical and logical unit (ALU) of said processor.

20. The method as recited in claim 17 wherein said circuit further includes sign extension circuitry, coupled to said upper shifter/router, that preserves a sign of said partitioned data as a function of said received control signal.

\* \* \* \* \*